United States Patent
Stroupe et al.

(10) Patent No.: US 7,233,229 B2
(45) Date of Patent: Jun. 19, 2007

(54) ACTIONABLE COMMUNICATION REMINDERS

(75) Inventors: Autumn L. Stroupe, North Bend, WA (US); David W. Flynt, Lake Forest Park, WA (US); Marc W. Todd, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 11/070,490

(22) Filed: Mar. 1, 2005

(65) Prior Publication Data

US 2006/0208861 A1    Sep. 21, 2006

(51) Int. Cl.
*G08B 1/00* (2006.01)
*H04L 12/58* (2006.01)
*H04M 3/42* (2006.01)

(52) U.S. Cl. .............................. 340/309.7; 340/309.16; 455/412.1; 455/412.2; 379/207.03

(58) Field of Classification Search ............. 340/309.7; 379/207.03
See application file for complete search history.

(56) References Cited

U.S. PATENT DOCUMENTS

| | | | |
|---|---|---|---|
| 7,084,758 B1 * | 8/2006 | Cole | 340/539.11 |
| 2001/0029175 A1 * | 10/2001 | Sellen et al. | 455/412 |
| 2002/0119768 A1 * | 8/2002 | Matsumoto et al. | 455/412 |
| 2003/0225797 A1 | 12/2003 | Shields et al. | |
| 2004/0075687 A1 | 4/2004 | Oshiro et al. | |
| 2004/0141011 A1 * | 7/2004 | Smethers et al. | 345/810 |
| 2004/0210851 A1 | 10/2004 | Premchandran et al. | |

* cited by examiner

*Primary Examiner*—Donnie L. Crosland
(74) *Attorney, Agent, or Firm*—Klarquist Sparkman, LLP

(57) ABSTRACT

Techniques and tools are described for providing actionable communication reminders. For example, an item representing an original communication is displayed and a command to set up a reminder to respond to the original communication is accepted. The reminder is set up and, at a later time, is displayed. An input mechanism that can be actuated to respond to the communication may be provided at the later time. As another example, a suggested time to display the reminder and suggested contact information for responding to the original communication are displayed while setting up a reminder.

20 Claims, 4 Drawing Sheets

Software 180 Implementing Actionable Communication Reminders

ACTIONABLE COMMUNICATION REMINDERS

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Described tools and techniques relate to reminders, and specifically to actionable communication reminders.

BACKGROUND

Mobile communication devices, such as personal desktop assistants, contemporary mobile telephones, hand-held computers, tablet personal computers, laptop personal computers, wearable computers and the like are becoming popular user tools. In general they have become small enough to be extremely convenient, while consuming less battery power, and at the same time have become capable of running more powerful applications. Such communication devices are often used to keep a user updated with current information by notifying the user of incoming messages. Such messages include audio messages such as telephone calls or voicemail, and textual messages such as e-mail, SMS messages, and instant messages.

Often a user of a mobile communication device receives a message (such as an e-mail or a missed telephone call), which needs attention. However, the user cannot always respond at the time the message is received. While the user could remind herself to respond by creating a task on the mobile device, sending herself an e-mail as a reminder, creating a calendar appointment, or writing a note on paper, these options are typically inefficient for the user. This is particularly true on mobile devices where text entry is difficult, such as many mobile telephones.

SUMMARY

In summary, the detailed description is directed to various techniques and tools for reminders and specifically to tools and techniques related to actionable communication reminders. Described embodiments implement one or more of the described techniques and tools including, but not limited to, the following:

In one aspect, a method includes receiving a communication item in a computing environment and accepting a user command to set up a reminder to respond to the communication item. A reminder is set up, which includes setting up a reminder time. At the reminder time, the reminder is communicated to a user. Additionally, an input mechanism can be actuated to respond to the communication item.

In another aspect, a communication device includes a memory storing computer software. The device also includes a processor programmed to execute the software to display an item representing an original communication, and to accept a user command to set up a reminder to respond to the original communication. The processor is also programmed to execute the software to set up the reminder, including automatically displaying a suggested time to display the reminder and automatically displaying suggested contact information for responding to the original communication. Finally, the processor is programmed to execute the software to display the reminder at a later time.

In another aspect, a computer-readable medium stores computer-executable instructions for causing a computer system to perform a method. The method includes displaying an item representing an original communication and accepting a command to set up a reminder to respond to the original communication. Additionally, a reminder is set up, which includes populating the reminder with information associated with the original communication. At a later time, the reminder is displayed and an input mechanism that can be actuated to respond to the communication is provided.

The various techniques and tools can be used in combination or independently.

Additional features and advantages will be made apparent from the following detailed description of different embodiments that proceeds with reference to the accompanying drawings.

DETAILED DESCRIPTION

The present application relates to techniques and tools for reminders and specifically to tools and techniques related to actionable communication reminders. Described embodiments implement one or more of the described techniques and tools.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific user interfaces, other user interfaces also can be used.

The various techniques and tools can be used in combination or independently. Different embodiments implement one or more of the described techniques and tools. Some techniques and tools described herein can be used in a mobile computing device, such as a mobile telephone or handheld computer, or in some other computing device, for example a desktop computer.

I. Computing Environment

Figure 1:
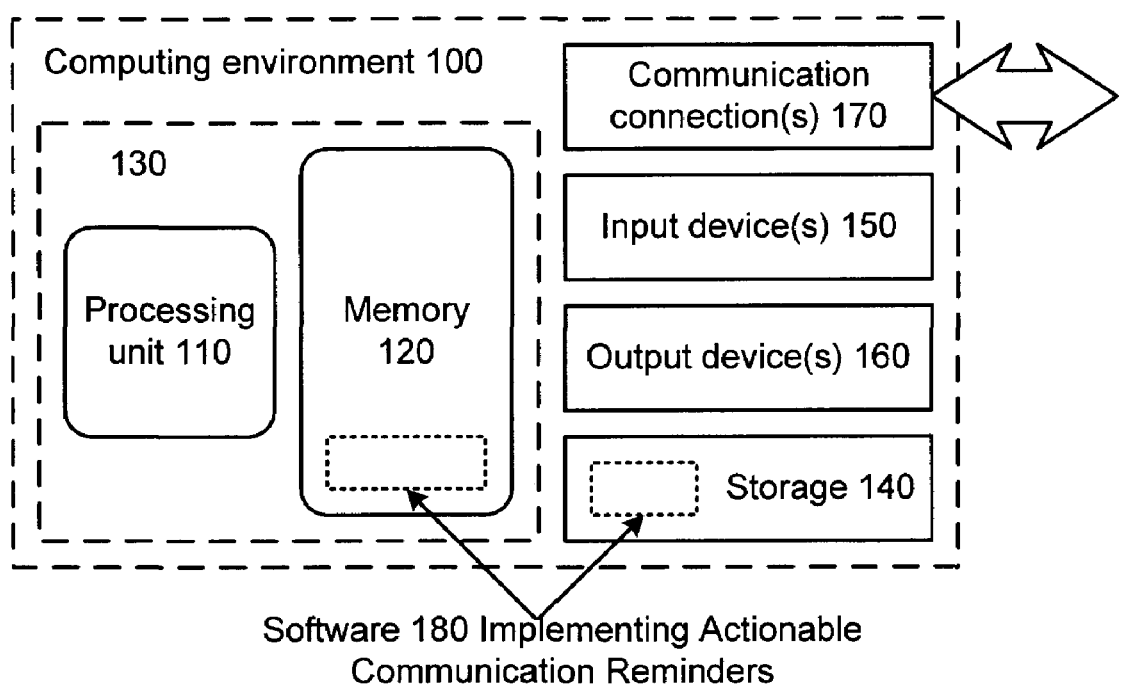
FIG. 1 is a block diagram of a suitable computing environment in conjunction with which described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and a memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing actionable communication reminders with one or more of the described techniques and tools.

A computing environment may have additional features. For example, the computing environment (100) includes a storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing actionable communication reminders.

The input device(s) (150) may be a touch input device such as a keyboard, mouse, pen, or trackball, a touch screen, a voice input device, a scanning device, or another device that provides input to the computing environment (100). The input device(s) (150) may also be a sound card, video card, TV tuner card, or similar device that accepts audio or video input in analog or digital form, or a CD-ROM or CD-RW that reads information into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include the memory (120), the storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "predict," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Communication Device

Figure 2:
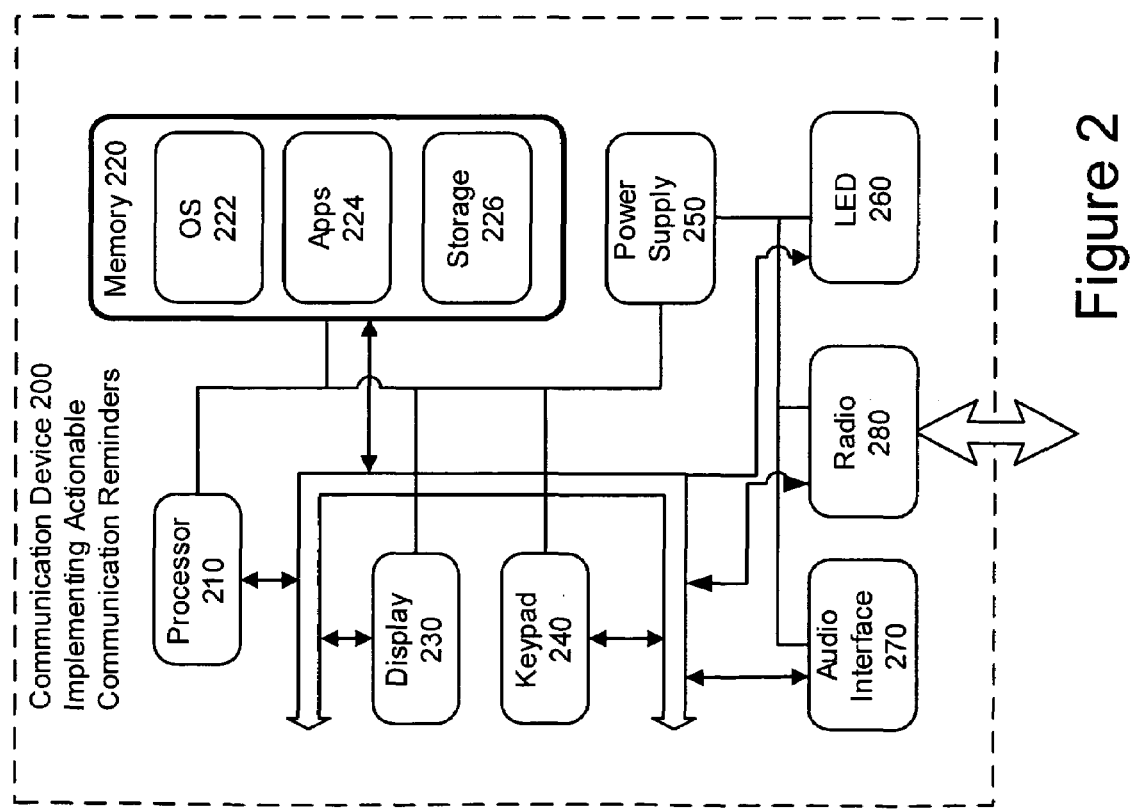
FIG. 2 is a block diagram of a suitable communication device in conjunction with which described embodiments may be implemented.

The computing environment may be in the form of a communication device, such as the communication device (200) illustrated as a functional block diagram in FIG. 2. In one implementation, the communication device (200) is a mobile communication device. The communication device (200) may be implemented as one or more desktop personal computers, multiprocessor systems, microprocessor-based or programmable consumer electronics, network PCs, and the like.

The communication device (200) may include many more components than those shown in FIG. 2. The components shown, however, are sufficient to disclose an illustrative embodiment for implementing the disclosed tools and techniques.

As shown in FIG. 2, the communication device (200) includes a processor (210), a memory (220), a display (230), and a keypad (240). The memory (220) generally includes both volatile memory (e.g., RAM) and non-volatile memory (e.g., ROM, Flash Memory, or the like). The communication device (200) includes an operating system (222), such as the Windows Mobile operating system from Microsoft Corporation or other such operating system, which is resident in the memory (220) and executes on the processor (210). The keypad (240) may be a push button numeric dialing pad (such as on a typical telephone) or a multi-key keyboard (such as a conventional keyboard). The display (230) may be a liquid crystal display, or any other type of display commonly used in mobile computing devices. For example, the display (230) may be touch-sensitive, and would then also act as an input device.

One or more application programs (224) are loaded into the memory (220) and run on the operating system (222). Instructions for implementing actionable communication reminders may be included in one or more application programs (224) and/or in the operating system (222). Examples of application programs include phone dialer programs, a switch manager, e-mail programs, calendar programs, word processing programs, spreadsheet programs, and so forth. The communication device (200) also includes a non-volatile storage (226) within the memory (220). The non-volatile storage (226) may be used to store persistent information which should not be lost if the communication device (200) is powered down. The application programs (224) may use and store information in the storage (226), such as e-mail, SMS, MMS, or other messages used by an e-mail application, appointment information used by a calendar program, documents used by a word processing application, and the like. A synchronization application may also reside on the communication device (200) and is programmed to interact with a corresponding synchronization application resident on a host computer to keep the information stored in the storage (226) synchronized with corresponding information stored at the host computer.

The communication device (200) also includes a power supply (250), which may be implemented as one or more batteries. The power supply (250) might further include an external power source, such as an AC adapter or a powered docking cradle that supplements or recharges the batteries.

The communication device (200) is also shown with two types of external notification mechanisms: an LED (260) and an audio interface (270). Other components, such as the display (230) may also operate as notification mechanisms. These devices may be directly coupled to the power supply (250) so that when activated, they remain on for a duration dictated by the notification mechanism even though the processor (210) and other components might shut down to conserve battery power. The LED (260) may be programmed to remain on indefinitely until the user takes action to indicate the powered-on status of the device. The audio interface (270) is used to provide audible signals to and receive audible signals from the user. For example, the audio interface (270) may be coupled to a speaker for providing audible output and to a microphone for receiving audible input, such as to facilitate a telephone conversation.

The communication device (200) also includes a radio (280) that performs the function of transmitting and receiving radio frequency communication. The radio (280) facilitates wireless connectivity between the communication device (200) and the outside world, for example via a communication carrier or service provider. Transmissions to and from the radio (280) are conducted under control of the operating system (222). In other words, communications received by the radio (280) may be disseminated to the application programs (224) via the operating system (222), and vice versa.

The radio (280) allows the communication device (200) to communicate with other computing devices, such as over a network. The radio (280) is an example of communication media discussed above.

III. Display Layout Implementation

Figure 3:
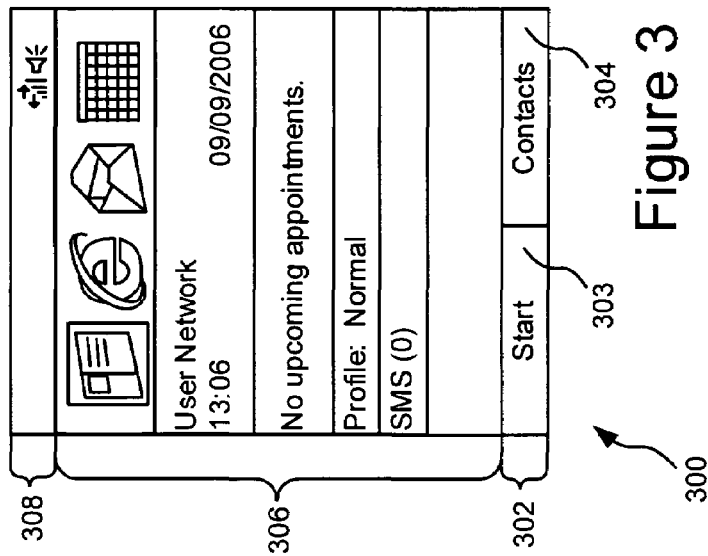
FIG. 3 is a diagram of a general display layout in conjunction with which described embodiments may be implemented.

FIG. 3 is a diagram illustrating the layout of an exemplary display screen (300) of a computing device such as the communication device (200) described above. The display screen (300) is a home screen that generally acts as an entry point to other screens and features. However, similar display features are present on lower level screens that are accessed from the home screen, as will become apparent from the description of other screens below. Generally, the implementation of the display screen (300) illustrated in FIG. 3 includes a soft key bar (302) along the bottom of the display. The soft key bar (302) includes a left soft key (303) and a right soft key (304). Each soft key (303, 304) displays a particular action, menu, screen, or other feature that is accessed by actuating a corresponding button on the communication device (referred to herein as actuating the soft key). The soft keys may be specific to the context of the application or feature that is currently being accessed. In some implementations, the right soft key (304) is used by applications to display context-specific menus, and the left soft key is used by applications to display context specific actions. In the home display screen (300), the left soft key (303) can be actuated to display a start screen that lists applications and features available on the communication device, such as calendar, e-mail, voicemail, call history, contacts, settings, and the like. The right soft key (304) can be actuated to display the contacts screen that lists information for available contacts.

Above the soft key bar (302) is a main screen area (306) that displays various information depending on the context. In the home screen, the main screen area (306) can include icons to directly access particular features or applications, as well as status information. Above the main screen (306) is a title bar (308), which can display application and status information, such as the title of the application, the date, bars indicating radio signal strength, etc.

The particular display screens described and illustrated herein are described as particular screens that can implement the described tools and techniques. However, various other types of display screen layouts or other types of user interfaces, such as audio interfaces, could be used.

IV. Actionable Communication Reminders

Figure 4:
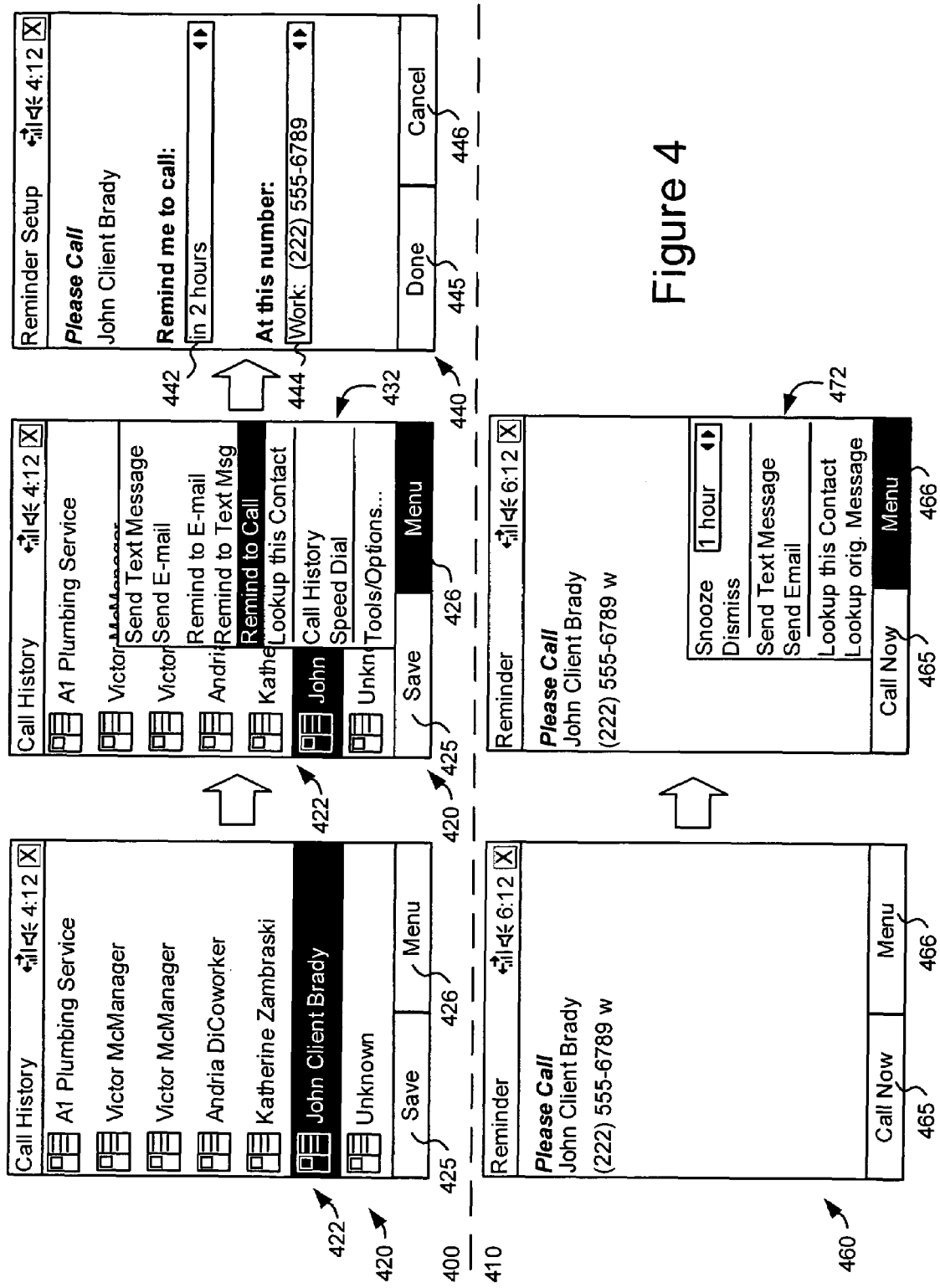
FIG. 4 is a diagram illustrating an exemplary flow of display screens during setup and display of an actionable communication reminder for a telephone call.
Figure 5:
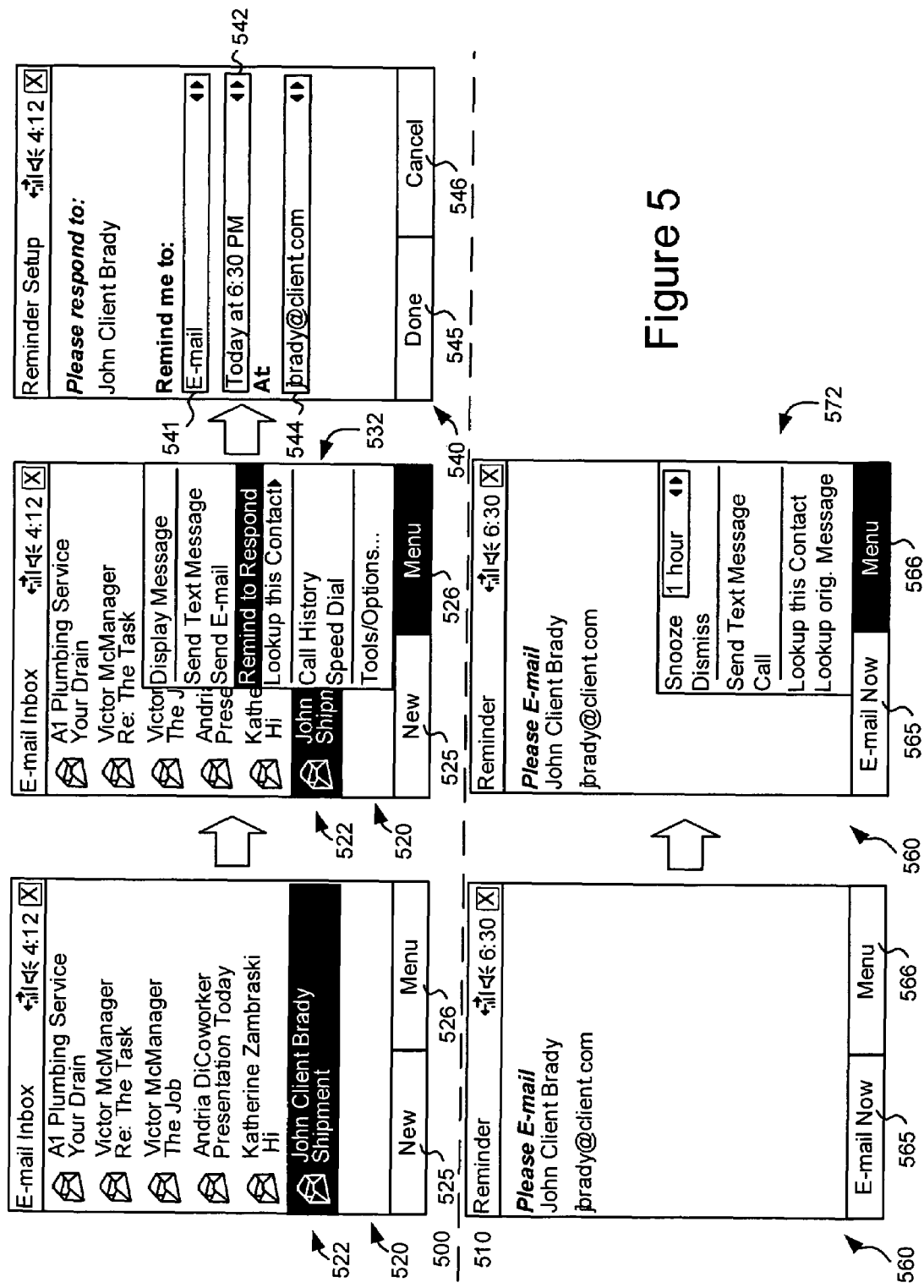
FIG. 5 is a diagram illustrating an exemplary flow of display screen shots during setup and display of an actionable communication reminder for an e-mail.

FIGS. 4 and 5 illustrate implementations of display screen flows for setting up and displaying actionable communication reminders. Often a user of a communication device receives a message (such as an e-mail or a missed telephone call), which needs attention. However, the user cannot always respond at the time the message is received. While the user could create a task on the device, send herself an e-mail as a reminder, create a calendar appointment, or write herself a note on paper, these options are typically inefficient for the user. This is particularly true on mobile devices where text entry is difficult, such as many mobile telephones.

An actionable communication reminder allows the user to set up a reminder without opening a separate application, such as e-mail, and manually entering information for the reminder. Instead, information from the item (such as an email or missed call information) may be used, possibly in conjunction with other available information, to create a reminder that will remind the user to respond to the item at some later time.

For example, the calendar application on the communication device may be used to find a time that is free. That time can be suggested to the user or can be used automatically. Also, the reminder can take the form of a calendar item used by the calendar application. The reminder may also be populated with relevant information from the original communication item, such as the name, phone number, and/or e-mail address that would be needed for the user to respond.

The user may be allowed to accept what is suggested or adjust it to suit her personal preferences. For example, if she missed a call from John Doe Customer, she can set the reminder up to call him back at the same number (his work number) or choose to call him at a different number (his mobile phone) if she knows he is more likely to answer that phone. As discussed below, this may be done without requiring the user to delete the populated number and manually enter the preferred number. It may also be done without accessing the contacts application to retrieve John Doe Customer's contact card. Similarly, if the user prefers to send John Doe Customer an e-mail instead of returning the phone call, she can set the reminder for that option as well.

At the appointed time, the user is notified and the actionable communication reminder is displayed on the communication device. The reminder allows the user to quickly and easily act on the reminder, such as by actuating the soft keys to make a telephone call. The actionable communication reminder allows the user to easily initiate the desired communication. The actionable communication reminder's soft keys reflect the communication method that will be initiated (such as call, SMS, e-mail, etc.) and can provide other options (such as snooze, dismiss, etc.) in a menu.

A. Actionable Communication Reminders Example: Phone Call

FIG. 4 illustrates an exemplary display flow during actionable communication reminder setup (400), which is illustrated at the top of FIG. 4, and actionable communication reminder display (410), which is illustrated at the bottom of FIG. 4.

Discussing first the reminder setup (400), at a call history screen (420) a call history list (422) is displayed in the main screen area. The call history list displays previous incoming calls to the communication device and/or outgoing calls from the communication device, and may also list missed incoming calls. A call listing from "John Client Brady" is highlighted. The left "save" soft key (425) displays the word "Save," indicating that the user can save the information for "John Client Brady" as a contact by actuating the left soft key (425). The right "menu" soft key (426) includes the word "Menu," indicating that the user can access pertinent menu items by actuating the right soft key (426). If the user actuates the right soft key (426), a menu (432) is displayed over the call history list (422) in the main screen area. The menu (432) displays actions that can be taken and/or features that can be accessed by actuating items on the menu (432). The menu items include "Remind to E-mail," "Remind to Text Msg," and "Remind to Call." These three items can be actuated to set up an actionable communication reminder to e-mail, send a text message, or call, respectively.

If the "Remind to Call" menu item is actuated, then a reminder setup screen (440) is displayed. The reminder setup screen could also be accessed in other ways, such as from a voicemail menu or an e-mail inbox.

The reminder setup screen (440) includes the name of the contact to call. Of course, the name may not be available for some calls and can be omitted. The screen (440) also includes a suggested reminder time in a reminder time selection box (442). This suggested time can be derived from information in a calendar application, such as by providing the next time that is available on the user's calendar. In this implementation, the user is given the option of revising the reminder time by highlighting the reminder time selection box (442) and actuating left or right arrow keys on a communication device. The reminder time could be revised by the user in other ways, such as by entering text or selecting a time from a displayed list. Similarly, the reminder setup screen (440) displays a suggested number to call in a contact number selection box (444). The suggested contact number can be obtained from available information, such as the information associated with the call history or information in a contacts application. The user is given the option of revising the suggested number by actuating right and left arrow keys. As with the reminder time, the contact number could be revised by the user in some other manner, such as by entering text or selecting a phone number from a displayed list.

When the reminder setup screen (440) is displayed, the left soft key (445) can be actuated to indicate that the user is done revising information on the reminder setup screen (440). The reminder is then set to be displayed at the indicated time. Alternatively, the right soft key (446) can be actuated to cancel the reminder.

The actionable communication reminder display flow (410) is illustrated at the bottom of FIG. 4. At the time selected during setup, a reminder screen (460) is displayed. The reminder screen (460) includes the name of the person to contact, if available, and the phone number or other contact information. The reminder screen (460) can include additional information, such as a picture of the person to contact or the person's title and company name. Moreover, the reminder screen (460) can include less information. For example, if the name of the person to call is not available from the call history application, the name can be omitted. At the reminder screen (460), the left soft key (465) can be actuated to communicate with the desired person, such as by calling the selected number. The right soft key (466) can be actuated to display a menu (472), which can include an item to snooze the reminder for a specified period of time that can be changed by the user, an item for dismissing the reminder, items for sending other types of communications to the desired person, an item for looking up the desired person's contact information, and an item for looking up and displaying the information about the original communication from the desired person (such as information about a missed call, information about a voicemail, an e-mail message, a text message, etc.). The menu can include more items, such as an item for accessing the call history screen. Conversely, the menu can include fewer items, such as by omitting an item for looking up contact information if none is available.

B. Actionable Communication Reminders Example: E-mail Message

Another exemplary actionable communication reminder display flow is illustrated in FIG. 5. The top portion of FIG. 5 illustrates a reminder setup flow (500), and the bottom portion of FIG. 5 illustrates a reminder display flow (510). Besides the difference in communication types involved (e-mail versus telephone calls), this example includes other differences from the example of FIG. 4 to illustrate the variety of specific implementations for actionable communication reminders. Of course, many other differences are also possible.

Beginning with the setup flow (500), an e-mail inbox screen (520) includes an inbox list (522) in the main screen area. The inbox list (522) displays e-mails in the user's inbox. An e-mail listing from "John Client Brady" is highlighted. The left soft key (525) displays the word "New," indicating that the user can compose a new e-mail by actuating the left soft key (525). The right "menu" soft key (526) includes the word "Menu," indicating that the user can access pertinent menu items by actuating the right soft key (526). If the user actuates the right soft key (526), a menu (532) is displayed over the inbox list (522) in the main screen area. The menu (532) displays actions that can be taken and/or features that can be accessed by actuating items on the menu (532). The menu items include "Display Message," "Send Text Message," "Send E-Mail," "Remind to Respond," "Lookup this Contact," "Call History," "Speed Dial," and "Tools/Options." These items can be actuated to display the highlighted message, compose a text message to the highlighted contact, send an e-mail to the highlighted contact, set up an actionable communication reminder to send a communication to the highlighted contact, display the call history screen, speed dial, and display the tools and options menu, respectively.

If the "Remind to Respond" menu item is actuated, a reminder setup screen (540) is displayed. The reminder setup screen (540) can also be accessed from other areas, such as from a voicemail menu, a text message inbox, or a call history screen.

The reminder setup screen (540) includes the name of the desired contact to receive a communication, here John Client Brady. Additionally, the screen (540) includes a communication type selection box (541), which includes a suggested communication type (here e-mail). The suggested communication type can be determined on the basis of available information, such as past reminders associated with the desired contact, the last communication type used, a registry setting, or a preset default communication type. The user can change the communication type by using left and right arrow keys to scroll through available communication types while the communication type selection box (541) is highlighted. Certain communication types may be included or excluded from the available types on the basis of available information. For example, if no E-mail address is available for the desired contact, then e-mail could be excluded from the available communication types. Of course, other ways of selecting the desired communication type are also possible.

The screen (540) also includes a suggested reminder time in a reminder time selection box (542). As discussed above, this suggested time can be derived from information in a calendar application, such as by providing the next time that is available on the user's calendar. In this implementation, the user is given the option of revising the reminder time by highlighting the reminder time selection box (542) and actuating left and right arrow keys on the communication device. Similarly, the reminder setup screen (540) displays suggested contact information in the form of a suggested destination e-mail address in a contact information selection box (544). The suggested e-mail address can be obtained from available information, such as the information associated with the original e-mail listed in the inbox or information in a contacts application. The user is given the option of revising the suggested e-mail address by actuating right and left arrow keys. As with the reminder time, the e-mail address could be revised by the user in some other manner, such as by entering text or selecting a phone number from a displayed list.

When the reminder setup screen (540) is displayed, the left soft key (545) can be actuated to indicate that the user is done revising information on the reminder setup screen (540). The reminder is then set to be displayed at the indicated time. The right soft key (546) can be actuated to cancel the reminder.

Actionable communication reminder display flow (510) is illustrated at the bottom of FIG. 5. At the time selected during setup, a reminder screen (560) is displayed. The reminder screen (560) can include the name of the person to contact, if available, and the e-mail address or other contact information (text message address for text message, instant messaging address for instant message, etc.). At the reminder screen (560), the left soft key (565) can be actuated to communicate with the desired person, such as by allowing the user to compose an e-mail to the selected address. The right soft key (566) can be actuated to display a menu (572), which can include an item to snooze the reminder for a specified period of time that can be changed by the user, an item for dismissing the reminder, items for sending other types of communications to the desired person, an item for looking up the desired person's contact information, and an item for looking up and displaying the information about the original communication from the desired person (such as information about a missed call, information about a voicemail, an e-mail message, a text message, etc.). The menu can include more options, such as accessing the call history screen or e-mail inbox screen. Conversely, the menu can include fewer items, such as by omitting an item for looking up contact information if none is available.

Having described and illustrated the principles of our invention with reference to various embodiments, it will be recognized that the various embodiments can be modified in arrangement and detail without departing from such principles. For example, while actionable communication reminders have been described herein in connection with phone calls and e-mails, they may be used for other types of communications as well. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, we claim as my invention all such embodiments as may come within the scope and spirit of the following claims and equivalents thereto.

We claim:

1. A method comprising:
   receiving a communication item in a portable computing environment;
   accepting a user command to set up a reminder in the computing environment to respond to the communication item;
   setting up the reminder in the computing environment, including communicating to the user a suggested time to display the reminder, communicating to the user suggested contact information; and in response to user input, setting up a reminder time;
   at the reminder time, communicating the reminder to a user and providing an input mechanism that can be actuated to respond to the communication item; and
   in response to actuation of the input mechanism, responding to the communication item.

2. The method of claim 1, wherein actuation of the input mechanism requires only a single action.

3. The method of claim 2, wherein responding to the communication item comprises dialing a telephone number.

4. The method of claim 1, wherein actuation of the input mechanism requires multiple actions.

5. The method of claim 4, wherein actuation of the input mechanism comprises providing input to compose a textual message.

6. The method of claim 4, wherein the message is selected from the group consisting of SMS messages, e-mail messages, and instant messages.

7. The method of claim 1, wherein setting up the reminder time comprises changing the reminder time from the suggested time to a new time in response to user input.

8. The method of claim 1, wherein the reminder time is the suggested time.

9. The method of claim 1 wherein the suggested time to display the reminder is at least in part derived from information in a calendar application.

10. The method of claim 1 wherein the suggested contact information is derived based on at least one of: past reminders associated with the contact, the last communication type used, a registry setting, or a preset default communication type.

11. A communication device comprising:
    a memory storing computer software;
    a processor programmed to execute the software to:
       display an item representing an original communication;
       accept a user command to set up a reminder to respond to the original communication;

set up the reminder, including automatically displaying a suggested time to display the reminder and automatically displaying suggested contact information for responding to the original communication, wherein the suggested time to display the reminder is an available calendar time; and at a later reminder time, display the reminder.

12. The device of claim 11, wherein setting up the reminder comprises accepting user input to change the suggested time to the reminder time.

13. The device of claim 11, wherein the processor is programmed to further execute the software to:

at the later time, provide an input mechanism that can be actuated to respond to the communication; and in response to actuation of the input mechanism, respond to the communication.

14. The device of claim 11, wherein actuation of the input mechanism requires only a single action and responding to the communication comprises dialing a telephone number.

15. The device of claim 11, wherein actuation of the input mechanism requires multiple actions and responding to the communication comprises sending a textual message.

16. The device of claim 11, wherein the communication device is a hand-held device.

17. A computer-readable medium storing computer-executable instructions for causing a computer system to perform a method comprising:

displaying an item representing an original communication;

accepting a command to set up a reminder to respond to the original communication;

setting up the reminder, including populating the reminder with information associated with the original communication;

at a later reminder time, displaying the reminder and providing an input mechanism that can be actuated to respond to the communication; and in response to actuation of the input mechanism, responding to the communication.

18. The computer-readable medium of claim 17, wherein actuation of the input mechanism requires only a single action and responding to the communication comprises dialing a telephone number.

19. The computer-readable medium of claim 17, wherein actuation of the input mechanism requires multiple actions and responding to the communication comprises sending a textual message.

20. The computer readable medium of claim 17, wherein the information associated with the original communication comprises contact information.

\* \* \* \* \*